May 17, 1949.  J. L. HAIGHT, JR  2,470,348
JET-PROPELLED AIRCRAFT

Filed July 20, 1944  5 Sheets-Sheet 1

Inventor:
John Lewis Haight, Jr.,
By Cushman Darby & Cushman
Attorneys.

May 17, 1949.  J. L. HAIGHT, JR  2,470,348
JET-PROPELLED AIRCRAFT

Filed July 20, 1944  5 Sheets-Sheet 2

Inventor:
John Lewis Haight, Jr.,
By Cushman Darby Cushman
Attorneys.

May 17, 1949. J. L. HAIGHT, JR 2,470,348
JET-PROPELLED AIRCRAFT
Filed July 20, 1944 5 Sheets-Sheet 3
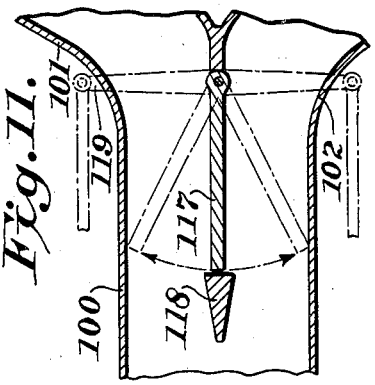
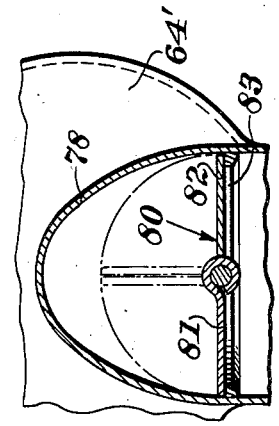
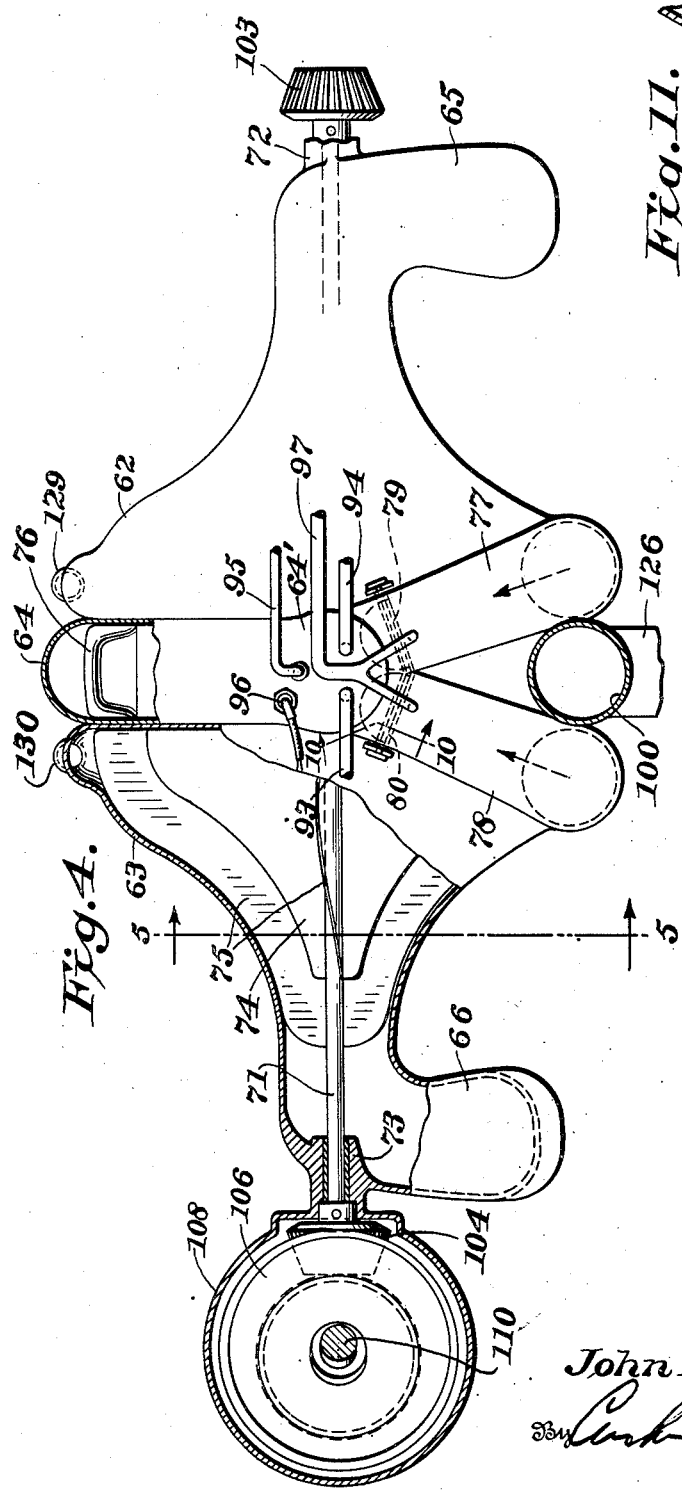
Inventor:
John Lewis Haight, Jr.,
By
Attorneys.

May 17, 1949. J. L. HAIGHT, JR 2,470,348
JET-PROPELLED AIRCRAFT

Filed July 20, 1944 5 Sheets-Sheet 4

Inventor:
John Lewis Haight, Jr.,
By Cushman Darby & Cushman
Attorneys.

May 17, 1949. J. L. HAIGHT, JR 2,470,348
JET-PROPELLED AIRCRAFT
Filed July 20, 1944 5 Sheets-Sheet 5
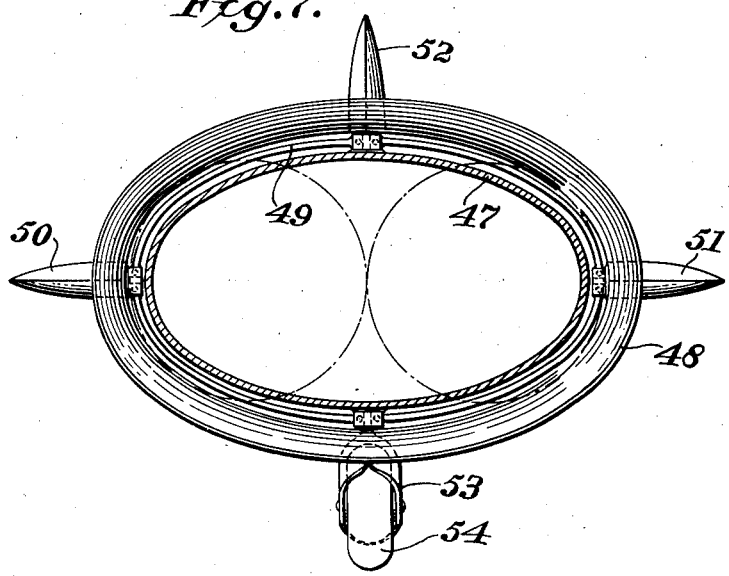
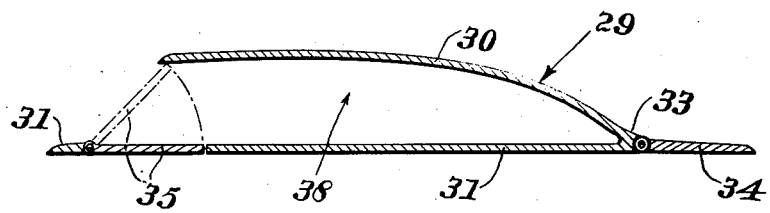
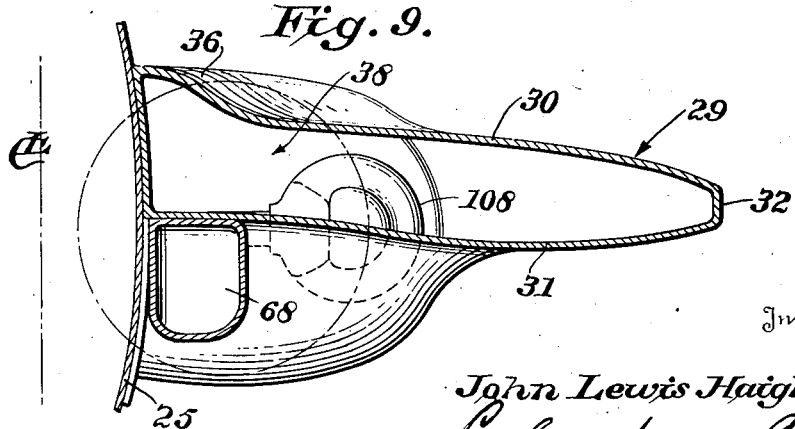
Inventor:
John Lewis Haight, Jr.,
Attorneys.

Patented May 17, 1949

2,470,348

UNITED STATES PATENT OFFICE 2,470,348

JET-PROPELLED AIRCRAFT

John Lewis Haight, Jr., Fort Worth, Tex.

Application July 20, 1944, Serial No. 545,823

9 Claims. (Cl. 244—15)

This invention relates to aircraft and particularly to aircraft of the jet-propelled type. A main object of the invention is to enhance the speed of such aircraft by reducing air resistance, and by supplementing the jet action with a powerful air blast, which blast is preferably induced by means driven from a turbine constituting the drive element of the jet-propulsion system. Numerous subsidiary objects are attained, as will appear from the following description of two embodiments of the invention offered by way of example. The description will refer to the accompanying drawings in which:

Figure 4 is a rear view on an enlarged scale, partly broken away, of a power plant which appears in Figure 1.

Figure 7 is a view substantially on line 7—7 of Figure 1.

Figure 8 is a section substantially on line 8—8 of Figure 1.

Figure 9 is a section substantially on line 9—9 of Figure 1.

Figure 10 is a section substantially on line 10—10 of Figure 1.

Figure 11 is a horizontal section, enlarged, of a portion of an exhaust conduit which appears in Figure 1.

Figure 1:
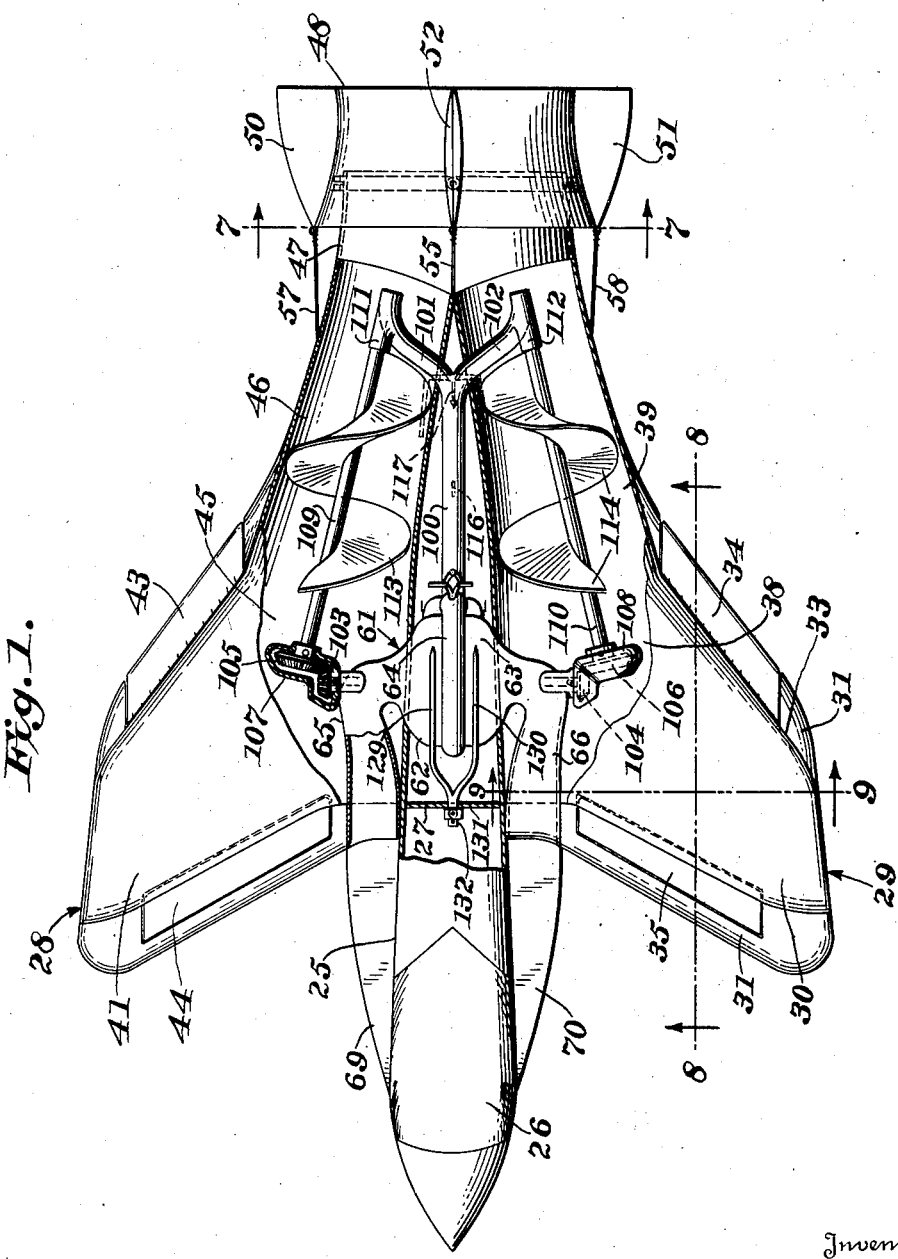
Figure 1 is a plan view, partly broken away, of an aircraft in accordance with the invention.

Referring first to Figures 1 to 11, reference numeral 25 designates a fuselage including a forward pilot's compartment 26 which is air tight and is bounded rearwardly by a transverse bulkhead 27. Forwardly swept wings 28 and 29 project from the fuselage. Referring to Figures 1 to 3, 8 and 9, wing 29 has upper and lower skins 30 and 31 which are joined at 32 along their outer edges and rearwardly along a line 33 which is spaced forwardly of the trailing edge of the lower skin. Set in the trailing edge portion of the lower skin is an elevon 34. The leading edge of the top skin 30 is set back from the leading edge of the bottom skin 31 and set in the bottom skin is an elevon 35 hinged at its leading edge. The leading edge of the top skin 30 is arched upwardly to the fuselage at 36, Figure 3, so that a forwardly faced air intake slot 37, which enlarges toward the fuselage, is provided. The upper and lower skins define a conduit 38 which funnels rearwardly, diminishing in horizontal dimension and increasing in vertical dimension so that a rear conduit portion 39 of cylindroidal form is provided.

The wing 28 in the same manner provides an inlet slot 40 between the top and bottom skins 41 and 42, rear and forward elevons 43 and 44 being present as in wing 29. Elevons 34 and 43 are so termed since preferably they may be actuated both in the manner of elevators and ailerons, and the same applies to ailerons 35 and 44.

Wing 28 provides a conduit portion 45 merging into a cylindroidal conduit portion 46, the latter and conduit portion 39 converging rearwardly and merging in an elliptical terminal conduit portion 47, Figure 7.

Mounted on and partially embracing the extremity of the conduit portion 47 in peripherally spaced relation is a Venturiform tailpiece 48. The tailpiece is mounted for universal tilting relative to its normal axis. Such capability of movement is obtainable, for example, by the use of a gimbal ring 49, Figure 7, pivoted on a vertical axis to the conduit portion 47 and on a horizontal axis to the tailpiece 48, suitable clearance for airflow being maintained between the walls of conduit portion 47 and the tailpiece. The tailpiece is provided with horizontal fins 50 and 51 and with vertical fins 52 and 53, a tail wheel 54 being partially housed within the latter. The tailpiece is connected through top and bottom cables 55 and 56 with control means in the cabin so as to be controllable in the manner of an elevator. The sides of the tailpiece are connected through cables 57 and 58, suitably bypassing the air conduits, with control means such as a rudder in the cabin. Normally the axis of the tailpiece is coincident with the axis of conduit portion 47, but the tailpiece can be inclined with respect to its normal axis in any direction for purposes of horizontal and vertical control.

Figure 2:
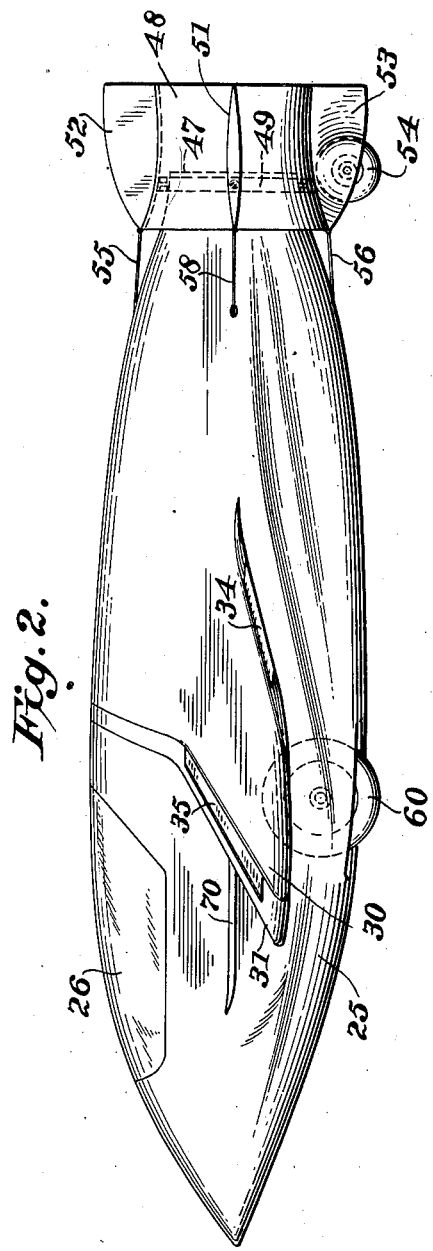
Figure 2 is a side elevation of the aircraft of Figure 1, seen slightly in perspective from the left rear and above.
Figure 3:
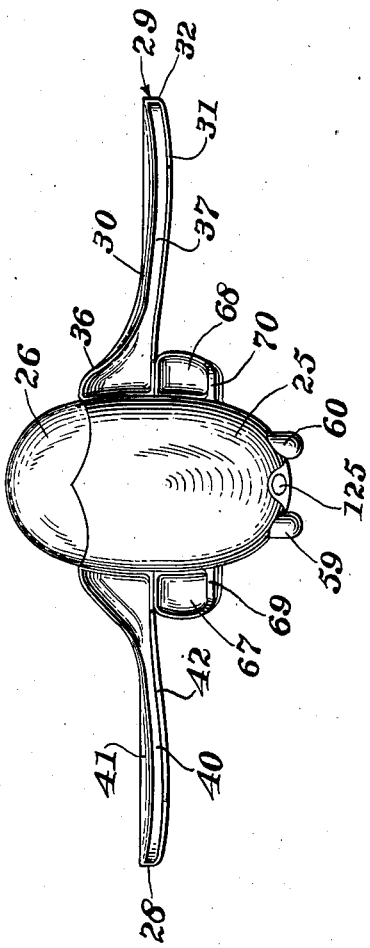
Figure 3 is a front elevation of the aircraft of Figure 1.

Forward landing wheels 59 and 60, Figures 2 and 3, have their upper portions received in recesses in the fuselage. These wheels project but slightly, as shown, so that projecting and retracting mechanism is unnecessary. In flight, the front wheels and the rear wheel rotate freely.

Disposed behind the bulkhead 27 substantially on the center of gravity of the craft is a power plant 61 comprising a pair of compressors or superchargers 62 and 63 and an intermediate turbine 64, the compressors and turbine having a common shaft which is at right angles to the vertical longitudinal plane of the fuselage. Conduits 65 and 66 extend axially from the compressors and then forwardly to terminate beneath the leading edges of wings 28 and 29 in openings 67 and 68, the lower walls of the conduits being continued in horizontal fins 69 and 70 which act as air scoops and as an aid to lateral stability.

Referring to Figure 4, reference numeral 71 designates the shaft of the compressor-turbine unit, the central portion of the shaft being suitably journaled and its ends being journaled in bearings 72 and 73 in the walls of conduits 65 and 66. The compressors may be of any suitable type. As indicated at the left of Figure 4, the compressor 63 includes a rotor comprising a hollow conoidal core piece 74 and blades as at 75. The turbine 64 may also be of any desired type. Its rotor may include radial cups such as are shown at 76, Figure 4.

Figure 6:
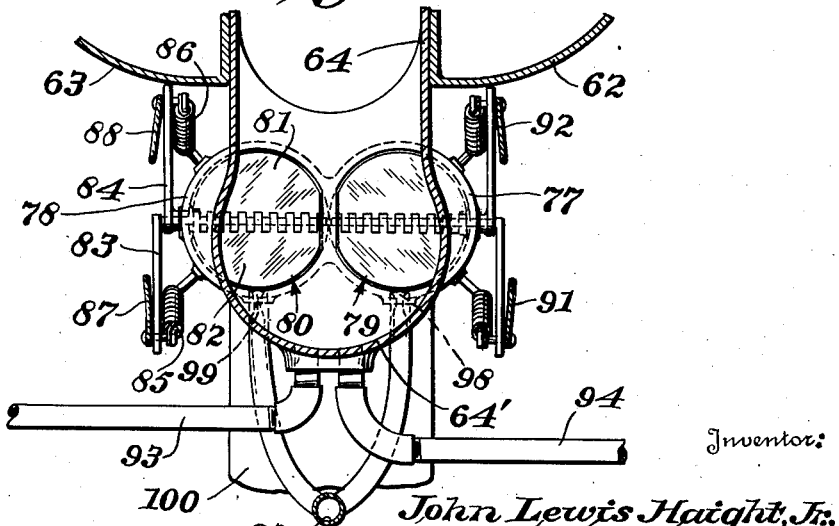
Figure 6 is a section substantially on line 6—6 of Figure 5.

The output of the compressors is led through pipes 77 and 78 and past valves 79 and 80 into the combustion chamber 64' of the turbine, Figures 6 and 10. The valve 80 is shown as comprising semi-circular flaps 81 and 82 adapted to cooperate with a seat 83. The adjacent edges of the flaps are provided with interfitted loops of which those of flap 82 are fixed to a stem to which is fixed an operating lever 83 disposed in the plane of the flap. Flap 81 has a projecting hub portion to which is fixed an operating lever 84 in the plane of the flap. Tension springs 85 and 86 act to seat the flaps as in Figure 6, and as shown in full lines in Figure 10. Cables 87 and 88 are attached to the ends of levers 83 and 84 and run to a ring 89 to which is connected an operating cable 90 which is lead into cabin 26. The valve 79 is the same as the valve 80 and its cables 91 and 92 also run to the ring 89 so that both valves are operable in unison.

Leading to the combustion chamber 64' are pipes 93 and 94 from oxygen and hydrogen supplies, respectively, and a pipe 95 leads from a water supply to an injection nozzle in the combustion chamber. Reference numeral 96 designates a spark plug for igniting the mixture in the combustion chamber. Reference numeral 97 designates a pipe leading from the normal liquid fuel supply, e. g. a low octane gasoline and distillate or fuel oil mixture, and branched into conduits 77 and 78 through nozzles 98 and 99.

The turbine exhaust conduit 100 extends rearwardly and then is branched into the cylindroidal air conduits. The ends of the branches 101 and 102 are directed rearwardly coaxially with the air conduits so that the jet openings at the ends thereof are somewhat convergingly disposed.

Shaft 71 of the compressor-turbine unit has bevel pinions 103 and 104 fixed to its ends and respectively engaging bevel gears 105 and 106 in housings 107 and 108 forming parts of the compressor housings. Gears 105 and 106 are fixed on shafts 109 and 110 journaled at their forward ends in bearings provided in the housings 107 and 108 and at their rear ends in bearings 111 and 112 on the conduit portions 101 and 102. The shafts are substantially co-axially arranged with respect to the cylindroidal air conduits and carry air propelling means here shown as helices 113 and 114. It will be obvious that shafts 109 and 110 will be oppositely driven from the turbine and the arrangement of the helices is such that they will propel air rearwardly in the air conduits.

In order to place the power plant in operation, hydrogen and oxygen are admitted to the combustion chamber 64' and ignited by the spark plug. Valves 79 and 80 being closed, expansive force of combustion is prevented from backing into the compressors and consequently, the force is confined to a driving effect on the turbine rotor. As the latter picks up speed, the compressors will begin to deliver and cable 90 will be operated to open valves 79 and 80. Carbureting air being thus available, the delivery of liquid fuel through nozzles 98 and 99 and water through pipe 95 is begun and the hydrogen and oxygen supply is diminished and discontinued as the turbine comes to speed. Due to the provision of valves 79 and 80, the drive of the turbine can be initiated without any necessity for the usual starting motor so that a very considerable economy is effected in this respect.

The combustion products pass through the exhaust conduit with extreme velocity to the rear jet openings. At the same time, helices 113 and 114 are being driven at high speed so that powerful air blasts are added to the jets, and a booster effect is added during flight by the Venturiform tailpiece. Desirably, additional water is injected at 115, Figure 5, and again at 116, Figure 1, so that the jet force is augmented by steam and a cooling effect is afforded.

Just ahead of the exhaust conduit branches 101 and 102, a diverter blade 117, Figures 1 and 11, is pivoted on a vertical axis behind a fixed splitter blade 118, blade 117 having fixed thereto externally of the conduit a cross bar 119 whose ends are connected to control members leading to the cabin. Normally, branches 101 and 102 have equal delivery but by swinging blade 117, the delivery may be varied and if, for example, the delivery through branch 101 is greater than that through branch 102, the craft will be turned to the left. If desired, blade 117 may be connected with the rudder control so that when left rudder, for instance, is applied and the tailpiece 48 is correspondingly swung, blade 117 will be swung counter-clockwise, Figure 1, and the turning effect will be enhanced by the jet differential.

Roll is controlled by either or both sets of elevons and for braking effect the forward elevons may both be swung upwardly to the position shown in dotted lines in Figure 8.

Figure 5:
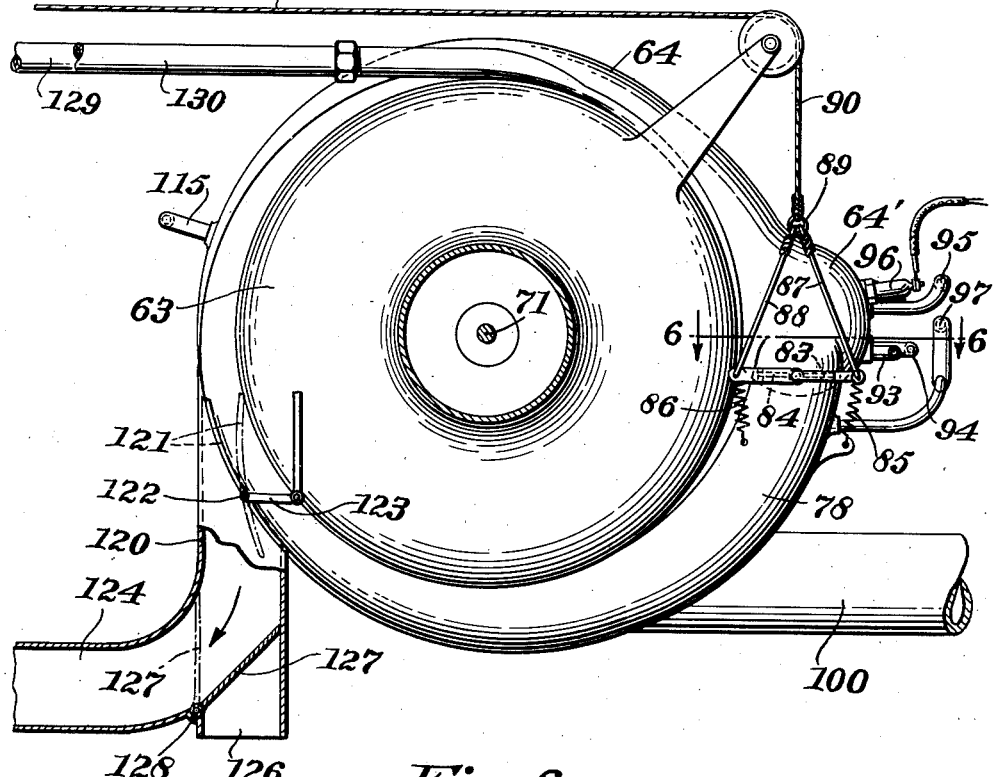
Figure 5 is a section substantially on line 5—5 of Figure 4.

In Figure 5, reference numeral 120 designates an exhaust conduit extending downwardly from the forward side of the turbine, beneath a movable piece 121, pivoted at 122, of the turbine stator. Normally, the piece 121 occupies the full line position indicated in Figure 5. Upon swinging it by means of an operating lever 123 to the dotted line position, exhaust will be directed into the conduit 120 and either forwardly through a conduit 124 to a forward outlet 125, Figure 3, or to a downwardly directed exhaust outlet 126, or in part through both, depending upon the position of a diverter valve 127 pivoted at 128 and controlled from the cabin. The forwardly directed jet is usable for braking and the downwardly directed jet for lift.

In order to maintain proper air conditions in the cabin, output pipes 129 and 130, Figure 1, are led from the compressors and are merged in a single pipe 131 which passes through the bulkhead 27 and is controlled by a valve 132. Heated fresh air is thus deliverable to the cabin to maintain the required pressure therein.

While the wings 28 and 29 are shown as being relatively small, they have a double lift effect by reason of the forward slots. Lift is exerted on both the top and bottom skins. Due to the open leading edges of the wings, air resistance is minimized and due to the exceedingly powerful propulsion effect of the combined jet and air blast, exceedingly high speeds are attainable.

Variations in the form and arrangement of parts beyond the disclosure herein are of course possible and are contemplated in the claims which follow.

I claim:

1. An aircraft comprising a body, means defining laterally elongated air intake openings at the sides of said body respectively, air conduits connecting said intake openings to rearwardly faced outlet openings at the rear of said body, each of said conduits including at its rearward end a cylindrical portion, turbine means including a combustion chamber in said body, compressor means in said body driven by said turbine means, a front air intake for the compression means, an outlet connection from the compressor means to said combustion chamber, exhaust conduit means for the turbine means having rearwardly directed jet openings within the cylindrical portions of said air conduits, and means driven from the turbine means for propelling air rearwardly in said air conduits.

2. Structure according to claim 1 wherein the axes of the turbine and compressor means extend transversely of said body, and wherein the air propelling means is constituted by contraturning air screws arranged on fore and aft axes in the air conduits respectively.

3. An aircraft comprising a body, a pair of air conduits which extend, anteriorly, laterally from and in oblique angular relation to the sides of said body respectively, each of said conduits being alar anteriorly and having a substantially plane nether shell which projects forwardly of the superior shell and which, together with the said upper shell, defines an elongate air intake opening, and which air conduits metamorphose anteroposteriorly to frusto-cones which rearwardly converge, a somewhat tapering cylindroidal conduit into which the said air conduits confluently merge, a posterior outlet opening for the cylindroidal conduit, a Venturiform tailpiece disposed in symmetrically spaced relation from and about the posterior portion of said cylindroidal conduit, duoplanic pivotal connections for the tailpiece and said conduit, means for directing the tailpiece selectively from an operator's station, and means for creating hypervelocitous pneumatic retrofluence in and effluence from the several conduits and the tailpiece.

4. Structure according to claim 3 wherein the means for creating hypervelocitous pneumatic retrofluence in and effluence from the several conduits and tailpiece comprises an internal-combustion engine, an exhaust conduit for said engine, a bifurcation for said conduit the rami of which extend into and become coaxial with the respective frusto-conic sections of the said air conduits, a jet opening, disposed at or near the merger of the respective air conduits with the cylindroidal conduit, for each ramus of the exhaust conduit bifurcation, and means for apportioning selectively the relative volume of exhaust gas delivered to and discharged from the said exhaust conduit rami, and the jet openings therefor, respectively.

5. Structure according to claim 3 wherein the means for creating hypervelocitous pneumatic retrofluence in and effluence from the several conduits and the tailpiece comprises: an internal-combustion engine transversely disposed in the body of the aircraft, a rearwardly extending exhaust conduit for the engine, a bifurcation for said conduit the rami of which extend into and become coaxial with the frusto-conic portions of the respective air conduits, a jet opening, rearwardly directed, for each of the said rami, means for apportioning selectively the relative volume of exhaust gas delivered to and discharged from the respective rami and their jet openings, a bilaterally extending propeller shaft for the engine, means for propelling air in each air conduit, and a driving connection for each air propelling means with the respective terminals of said propeller shaft, said driving connections being adapted for producing contrarotation of the air propelling means.

6. Structure according to claim 3 wherein the means for creating hypervelocitous pneumatic retrofluence in and effluence from the several conduits and tailpiece comprises: an internal-combustion engine, exhaust conduit means for said engine, a bifurcation for said conduit means the rami of which extend into and become coaxial with the frusto-conic sections of the respective air conduits, a jet opening, disposed at or near the merger of the respective air conduits with the cylindrical conduit, for each ramus of the exhaust conduit bifurcation, means for apportioning selectively the relative volumes of exhaust gas delivered to and discharged from the said rami and their jet openings respectively, a propeller shaft extending transversely and bilaterally for the engine, helical air screws arranged on fore and aft axes in the frusto-conic sections of the air conduits respectively, a driving connection for each helix with the said propeller shaft, and means for producing contrarotation of the helices.

7. Structure according to claim 3 wherein the means for creating hypervelocitous pneumatic retrofluence in and effluence from the several conduits comprises: compressor-turbine means including a turbine, air compressing means driven by the turbine, a combustion chamber, air intake means having forwardly faced inlet openings for the compressor means, an outlet connection for the compressor means with the combustion chamber, means for supplying a combustible mixture to the said chamber, means for igniting said combustible mixture, means for delivering motive fluid from the said chamber to the turbine, an exhaust conduit for the turbine, a bifurcation for the said conduit the rami of which extend into and become coaxial in and with the posterior portions of the respective air conduits, a rearwardly directed jet opening, disposed at or near the merger of the respective air conduits with the cylindroidal conduit, for each ramus of the exhaust conduit, and means for selectively apportioning the volume of exhaust gas received and discharged by the respective rami and their jet openings.

8. Structure according to claim 3 wherein the means for creating hypervelocitous pneumatic retrofluence in and effluence from the several conduits and the tailpiece comprises: a compressor-turbine including a turbine, air compressing means driven by the turbine, a combustion chamber, air intake means having forwardly faced inlet means, for the compressor means, an outlet connection for the compressor means with the combustion chamber, means for supplying a combustible mixture to the combustion chamber, means for igniting a combustible mixture in the combustion chamber, means for delivering motive fluid from the said chamber to the turbine, a pair of exhaust conduits which posteriorly are coaxially disposed within the frusto-conic portions of the respective air conduits, connection means for said exhaust conduits with said turbine, a jet opening for each exhaust conduit disposed at or near the merger of the respective air conduits with the cylindroidal common conduit, means for selectively apportioning the relative volume of exhaust gas received by the respective exhaust conduits, a transversely and bilaterally extending propeller shaft for the turbine, means for propelling air in the respective air conduits, and a driving connection for each air propelling means with the said propeller shaft for the turbine, said driving connections being adapted for producing contrarotation of the air propelling means.

9. Structure according to claim 3 wherein the means for creating hypervelocitous pneumatic retrofluence in and effluence from the several conduits and the tailpiece comprise: compressor-turbine means, transversely disposed within the body of the aircraft, including a turbine, air compressing means driven by said turbine, a combustion chamber, connection means for the said chamber with the air compressing means, bilateral air intake means for the compressor means including elongate air scoops extending along the respective sides of the body of the aircraft and rearwardly metamorphosing to conduits communicating with said compressor means, means for supplying a combustible mixture to the combustion chamber, means for igniting said mixture, a connection for the combustion chamber with the turbine means, exhaust conduit means for the turbine means including rami disposed substantially coaxially in the posterior sections of the respective air conduits, a rearwardly faced jet opening, disposed proximally to the juncture of the respective air conduits with the cylindroidal conduit, for each of said rami, valve means for apportioning selectively the relative volumes of gas delivered to and discharged from the respective exhaust conduit rami and their jet openings, a bilaterally extending propeller shaft for the turbine means, helices arranged on fore and aft axes in the frusto-conic sections of the air conduits respectively, and a driving connection for each helix with said propeller shaft, said driving connections being adapted for producing contrarotation of the helices.

JOHN LEWIS HAIGHT, Jr.

REFERENCES CITED

The following references are of record in the file of this patent:

UNITED STATES PATENTS

| Number | Name | Date |
| --- | --- | --- |
| 1,382,535 | Offen | June 21, 1921 |
| 1,624,475 | Coe | Apr. 12, 1927 |
| 1,642,752 | Landon | Sept. 20, 1927 |
| 1,669,495 | Sloan | May 15, 1928 |
| 1,814,948 | Miner | July 14, 1931 |
| 1,854,615 | Lasley | Apr. 9, 1932 |
| 1,855,480 | Koslowski | Apr. 26, 1932 |
| 1,938,234 | Voorhees | Dec. 5, 1933 |
| 2,081,151 | Myers | May 25, 1937 |
| 2,162,956 | Lysholm | June 20, 1939 |
| 2,168,726 | Whittle | Aug. 8, 1939 |
| 2,198,229 | Price | Apr. 23, 1940 |
| 2,283,863 | Achterman | May 19, 1942 |
| 2,340,396 | McDonnell | Feb. 1, 1944 |
| 2,348,253 | Griswold | May 9, 1944 |
| 2,401,941 | Lee | June 11, 1946 |

FOREIGN PATENTS

| Number | Country | Date |
| --- | --- | --- |
| 16,754 | Great Britain | 1910 |
| 325,002 | Great Britain | Feb. 10, 1932 |
| 403,730 | France | Oct. 2, 1909 |
| 432,727 | France | Oct. 11, 1931 |
| 538,022 | Great Britain | July 17, 1941 |
| 542,653 | Great Britain | Jan. 21, 1942 |
| 870,648 | France | Dec. 22, 1941 |